United States Patent
Hung

(10) Patent No.: US 7,483,172 B2
(45) Date of Patent: Jan. 27, 2009

(54) IMAGE PROCESSING APPARATUS AND IMAGE PROCESSING METHOD

(75) Inventor: Po-Chieh Hung, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 828 days.

(21) Appl. No.: 10/964,095

(22) Filed: Oct. 13, 2004

(65) Prior Publication Data

US 2005/0083546 A1 Apr. 21, 2005

(30) Foreign Application Priority Data

Oct. 17, 2003 (JP) .............................. 2003-358020

(51) Int. Cl.
*H04N 1/60* (2006.01)
*G06K 9/00* (2006.01)

(52) U.S. Cl. .................. 358/1.9; 358/518; 358/523; 358/527; 382/162; 382/167

(58) Field of Classification Search .................. 358/1.9, 358/518, 504, 523, 1.13, 517, 527; 382/162, 382/167; 345/153; 347/15, 43; 399/23, 399/237, 298, 299
See application file for complete search history.

(56) References Cited

U.S. PATENT DOCUMENTS

| 6,873,438 | B2 * | 3/2005 | Fotland ...................... 358/1.9 |
| 2003/0189716 | A1 * | 10/2003 | Tsuji et al. .................... 358/1.9 |
| 2003/0234943 | A1 * | 12/2003 | Van Bael ...................... 358/1.9 |

FOREIGN PATENT DOCUMENTS

| JP | 11-69176 | 3/1999 |
| JP | 2000-62253 | 2/2000 |
| JP | 2001-136401 | 5/2001 |
| JP | 2001-157074 | 6/2001 |

OTHER PUBLICATIONS

English Abstract for Japanese Patent Application No. 2001-136401 dated May 18, 2001.
English Abstract for Japanese Patent Application No. 2001-157074 dated Jun. 8, 2001.
English Abstract for Japanese Patent Application No. 11-69176 dated Mar. 9, 1999.
English Abstract for Japanese Patent Application No. 2000-62253 dated Feb. 29, 2000.

\* cited by examiner

*Primary Examiner*—Edward L Coles
*Assistant Examiner*—Charlotte M Baker
(74) *Attorney, Agent, or Firm*—Cantor Colburn LLP

(57) ABSTRACT

An image processing apparatus having a processor for calculating an image signal for proofing a proof apparatus, when an original color image outputted from a first output apparatus is reproduced by a second output apparatus. The processor is configured to calculate correlation information between each signal value of device dependent color of the first output apparatus and a device independent color, in a process of creating, by color gamut mapping, a first color conversion profile for converting an original image signal for the first output apparatus into an image signal for reproduction for the second output apparatus; to create a second color conversion profile for converting the original image signal into a calorimetric value or a signal value derived from it, based on the correlation information; and to convert the original image signal into the image signal for proof, based on the second conversion profile.

18 Claims, 7 Drawing Sheets

IMAGE PROCESSING APPARATUS AND IMAGE PROCESSING METHOD

BACKGROUND OF THE INVENTION

The present invention relates to an image processing apparatus and an image processing method for proofing the reproduced color of a reproduced image.

According to prior art practice, when an original image for a display (a first output apparatus) for outputting a color image is to be outputted by means of a color printer (a second output apparatus), the output colors are different between the display and printer; consequently, a reproduction profile showing the relationship of output colors between the display and printer is used to convert the original image signal for display into the reproduction image signal for printer (e.g. Patent Documents 1 and 2).

In this case, in order to avoid wasting a recording medium due to printer outputting, it is preferred to check in advance to see whether or not the output color changes according to the type of the device. For this purpose, before starting printing operation, a color image for proofing, having the color maximally similar to that of the image to be printed by the printer—namely, a proof image—is outputted through a poof device such as a color display or other color printer.

Incidentally, in recent years, there has been a remarkable improvement in the color printer performance. An image can be outputted in hifi colors such as R, G and B, in addition to the normal colors of Y, M, C and K.

Accordingly, to get the proof image as described above, the following methods have been proposed; a method for getting a proof image for printer, using a normal ink (coloring material) and one type of hifi color ink (Patent Documents 3 and 4), and a method for getting a proof image for printer, for measuring all colors in a combinations of the types of inks used and adjusting colors based on this measurement (Non-patent Document 1).

The following describes the method disclosed in the Non-patent Document 1. According to this method, an arithmetic processing apparatus 101 creates a profile for reproduction 100, for converting an original image signal into the image signal for reproduction, as shown in FIG. 7. This profile for reproduction 100 shows the relationship between the output colors of a display 102 and a printer 103. It is created as a Look Up Table (LUT).

Then an arithmetic processing apparatus 105 creates a profile for proof 104 for converting the image signal for reproduction into the image signal for proof. The profile for proof 104 indicates the relationship between the output colors of the printer 103 and proof apparatus 106. The profile for reproduction 100 and profile for proof 104 can be created as one profile.

Then the arithmetic processing apparatuses 101 and 105 perform interpolation arithmetic processing, and convert the original image signal into an image signal for proof, based on the profile for reproduction 100 and profile for proof 104.

Based on this image signal for proof, the proof device 106 outputs a proof image.

[Patent Document 1] Official Gazette of Japanese Patent Tokkaihei 11-069176

[Patent Document 2] Official Gazette of Japanese Patent Tokkai 2001-136401

[Patent Document 3] Official Gazette of Japanese Patent Tokkai 2001-157074

[Patent Document 4] Official Gazette of Japanese Patent Tokkai 2000-62253

[Non-Patent Document 1] Adobe system, "Soft Proofs of Adobe Photoshop",[online], Adobe systems, [Searched on Oct. 13, 2003], Internet <URL http: //www.ilcolor.co.jp/images/knowledge/trn/pdf/PS#SettingPrint#J.pdf>

However, according to the methods disclosed in the aforementioned Patent Documents 3 and 4, when the printer mixes the hifi color to use it for color reproduction, the image signal for proof cannot be obtained.

Further, in the method disclosed in the aforementioned [Non-Patent Document 1], when creating a profile for proof 104, there is an exponential growth in the combination between the output colors of the printer 103 and proof apparatus 106, with the increase in the number of the color materials m used by the printer 103. This raises the problem of requiring a vast amount of memory capacity for arithmetic processing. For example, when each color is divided into five grades to create a color card, the number of combinations, there is an exponential increase of $5^4=625$, $5^5=3125$, $5^6=15625$, $5^7=78125$, ... for m=4, 5, 6, 7, ...

SUMMARY OF THE INVENTION

In view of the prior art described above, the object of the present invention is to provide an image processing apparatus and image processing method capable of proofing with a smaller memory capacity, when reproducing an original image using a plurality of hifi colors.

The object of the present invention mentioned above can be achieved by the following structure:

(1) An image processing apparatus comprising an arithmetic processing apparatus for calculating an image signal for proof in order for proofing a reproduced color with a proof apparatus when an original color image outputted from a first output apparatus is reproduced by a second output apparatus, wherein the arithmetic processing apparatus is configured to:

calculate correlation information between each signal value of device dependent color of the first output apparatus and a device independent color, in a process of creating, by color gamut mapping, a first color conversion profile for converting an original image signal for the first output apparatus into an image signal for reproduction for the second output apparatus;

create a second color conversion profile for converting the original image signal into a calorimetric value or a signal value derived from the calorimetric value, based on the correlation information; and convert the original image signal into the image signal for proof, based on the second conversion profile.

Here the value derived from the calorimetric value is defined as a value associated with the calorimetric value.

The calorimetric value and the value derived therefrom include L*a*b* values, RGB values and XYZ values.

Further, the calorimetric value and the value derived therefrom can be the signal values of the device dependent color of a proof apparatus or signal values of device independent color.

According to the invention described in (1), information on correspondence between each signal value of device dependent color of the first output apparatus and device independent color is calculated during creation of the first color conversion profile. Based on this correspondence information, the second color conversion profile is created. Unlike the prior art of creating the aforementioned profile for proof showing the relationship between the second output apparatus and that of the proof apparatus, this structure (1) creates the second color conversion profile for proof with a smaller memory capacity even if a plurality of hifi colors are outputted by the second output apparatus. Namely, this structure allows proofing to be performed with a smaller memory capacity, even when a plurality of hifi colors are used to reproduce the original image.

DETAILED DESCRIPTION OF THE PREFERRED EMBODIMENT

Figure 1:
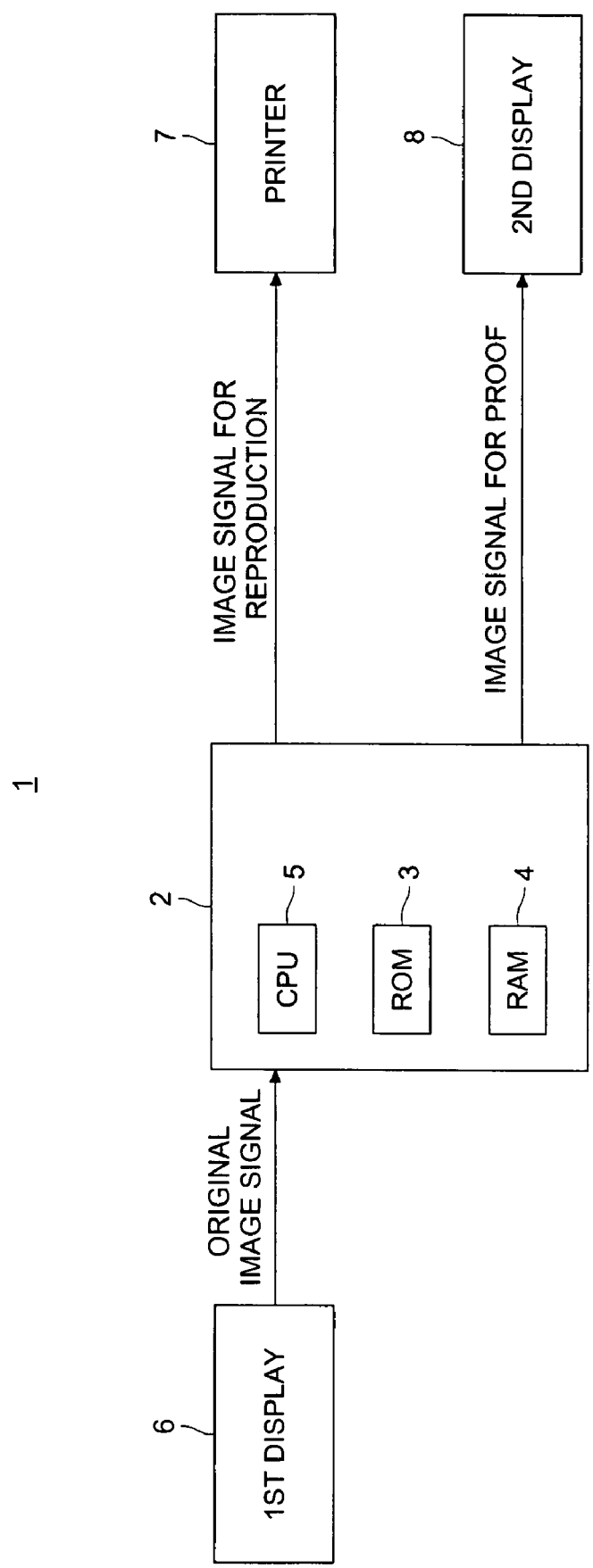
FIG. 1 is a block diagram showing the schematic configuration of an image processing apparatus of the present invention.

The object of the present invention mentioned above can also be achieved by the following structures:

(2) The image processing apparatus described in (1), wherein the aforementioned second output apparatus uses the hifi color material other than CMY or RGB.

Term "CMY" in the sense in which it is used here refers to cyan, magenta and yellow, and "RGB" refers to red, green and blue.

The coloring material refers to ink or toner when the second output apparatus is a printer, for example, and refers to phosphor or liquid crystal when the second output apparatus is a display.

According to the invention described in (2), proofing is enabled without high-order characterization, even when a hifi color printer requiring many calorimetric operations is used as the second output apparatus.

(3) The image processing apparatus described in (1) or (2) wherein the aforementioned first output apparatus and proof apparatus belong to one and the same display.

According to the invention described in (3), the first output apparatus and proof apparatus belong to one and the same display. This arrangement ensures easy comparison between the original image and proof image.

The aforementioned display is preferred to allow the original image and proof image to be displayed in parallel.

This configuration ensures easy comparison between the original image and proof image.

(4) The image processing apparatus described in any one of (1) through (3) wherein the value of the image signal for proof indicates a device independent color.

According to the invention described in (4), the value of the image signal for proof indicates a device independent color. This arrangement permits a desired proof apparatus to be selected for use.

(5) The image processing apparatus described in any one of (1) through (4) wherein the aforementioned arithmetic processing apparatus allows the first color conversion profile and second color conversion profile to be stored in one and the same file.

According to the invention described in (5), the arithmetic processing apparatus allows the first color conversion profile and second color conversion profile to be stored in one and the same file. This ensures easy handling of the color conversion profile.

(6) An image processing method for calculating an image signal for proof in order for proofing a reproduced color with a proof apparatus when an original color image outputted from a first output apparatus is reproduced by a second output apparatus, wherein the image processing method comprising the steps of:

calculating correlation information between each signal value of device dependent color of the first output apparatus and a device independent color, in a process of creating, by color gamut mapping, a first color conversion profile for converting an original image signal for the first output apparatus into an image signal for reproduction for the second output apparatus;

creating a second color conversion profile for converting the original image signal into a calorimetric value or a signal value derived from the calorimetric value, based on the correlation information; and converting the original image signal into the image signal for proof, based on the second conversion profile.

According to the invention described in (6), information on correspondence between each signal value of device dependent color of the first output apparatus and device independent color is calculated during creation of the first color conversion profile. Based on this correspondence information, the second color conversion profile is created. Thus, unlike the prior art of creating the aforementioned profile for proof showing the relationship between the second output apparatus and that of the proof apparatus, this structure (6) creates the second color conversion profile for proof with a smaller memory capacity even if a plurality of hifi colors are outputted by the second output apparatus. Namely, this structure allows proofing to be performed with a smaller memory capacity, even when a plurality of hifi colors are used to reproduce the original image.

(7) The image processing method described in (6), wherein the coloring material of the aforementioned second output apparatus uses the hifi color material other than CMY or RGB.

According to the invention described in (7), proofing is enabled without high-order characterization, even when a hifi color printer requiring many calorimetric operations is used as the second output apparatus.

(8) The image processing method described in (6) or (7), wherein one and the same display is used as the aforementioned first output apparatus and proof apparatus.

According to the invention described in (8), one and the same display is used as the first output apparatus and proof apparatus. This arrangement ensures easy comparison between the original image and proof image.

(9) The image processing method described in any one of (6) through (8) wherein the signal value as the image signal for proof indicates a device independent color.

According to the invention described in (9), the signal value as the image signal for proof indicates a device independent color. This arrangement permits a desired proof apparatus to be selected for use.

(10) The image processing method described in any one of (6) through (9) wherein the first color conversion profile and second color conversion profile are stored in one and the same file.

According to the invention described in (10), the first color conversion profile and second color conversion profile are stored in one and the same file. This ensures easy handling of the color conversion profile.

EFFECTS OF THE INVENTION (1) According to the invention described in (6), proofing is possible with a smaller memory capacity even if a plurality of hifi colors are used to reproduce the original image.

(2) According to the invention described in (7), proofing is enabled without high-order characterization, even when a hifi color printer is used as the second output apparatus. In this case, it goes without saying that the same effect as that in the case of the inventions described in (1) and (6).

(3) According to the invention described in (8), easy comparison between the original image and proof image is provided. In this case, it goes without saying that the same effect as that in the case of the inventions described in (1), (2), (6) or (7).

(4) According to the invention described in (9), a desired proof apparatus can be selected for use. In this case, it goes without saying that the same effect as that in the case of the inventions described in any one of (1) through (3) and (6) through (8).

(5) According to the invention described in (10), easy handling of the color conversion profile. In this case, it goes without saying that the same effect as that in the case of the inventions described in any one of (1) through (4) and (6) through (9).

The following describes the present embodiments with reference to drawings. It should be noted that the following description refers to the preferred embodiments of the present invention, without the present invention being restricted thereto.

Embodiment 1

The image processing apparatus of the present invention will be described in the first place. FIG. 1 is a block diagram showing the schematic configuration of an image processing apparatus 1.

As shown in FIG. 1, the image processing apparatus 1 has a first display (first output apparatus) 6, a printer (second output apparatus) 7 and a second display (proof apparatus) 8.

The first display 6 outputs the original color image based on the original image signal. A color CRT, color liquid crystal, PDP and others can be used as the first display 6.

In the present embodiment, the original image signal is assumed to indicate the colors in terms of sRGB. The sRGB refers to the standard RGB color space specified in the IEC61966-2-1.

The printer 7 outputs the reproduced form of the original image according to the image signal for reproduction. This printer 7 uses the RGB hifi color ink in addition to the ink of normal color (coloring material) and outputs an image formed by a combination of different types of ink having a total of seven colors.

Based on the image signal for proof, the second display 8 outputs the proof image and proofs the color reproduced by the printer 7. The same kind of device as the first display 6 can be used as the second display 8.

These first display 6, printer 7 and second display 8 are connected with the arithmetic processing apparatus 2 for converting the original image into the image signal for reproduction and image signal for proof.

The arithmetic processing apparatus 2 is provided with a ROM (Read Only Memory) 3, RAM (Random Access Memory) 4 and CPU (Central Processing Unit) 5.

The ROM 3 contains an image processing program.

This image processing program allows the arithmetic processing apparatus 2 to perform the process of profile creation for creating the first color conversion profile (FIG. 2) 21 for converting the original image signal into the image signal for reproduction and the second color conversion profile (FIG. 2) 22 for converting the original image signal into the image signal for proof. The first color conversion profile 21 is a device link profile linking between the first display 6 and printer 7. The second color conversion profile 22 is a device link profile linking between the first display 6 and second display 8.

Based on the first color conversion profile 21 and second color conversion profile 22, the image processing program allows the arithmetic processing apparatus 2 to perform the process of converting the original image signal into the image signal for reproduction and image signal for proof.

Figure 2:
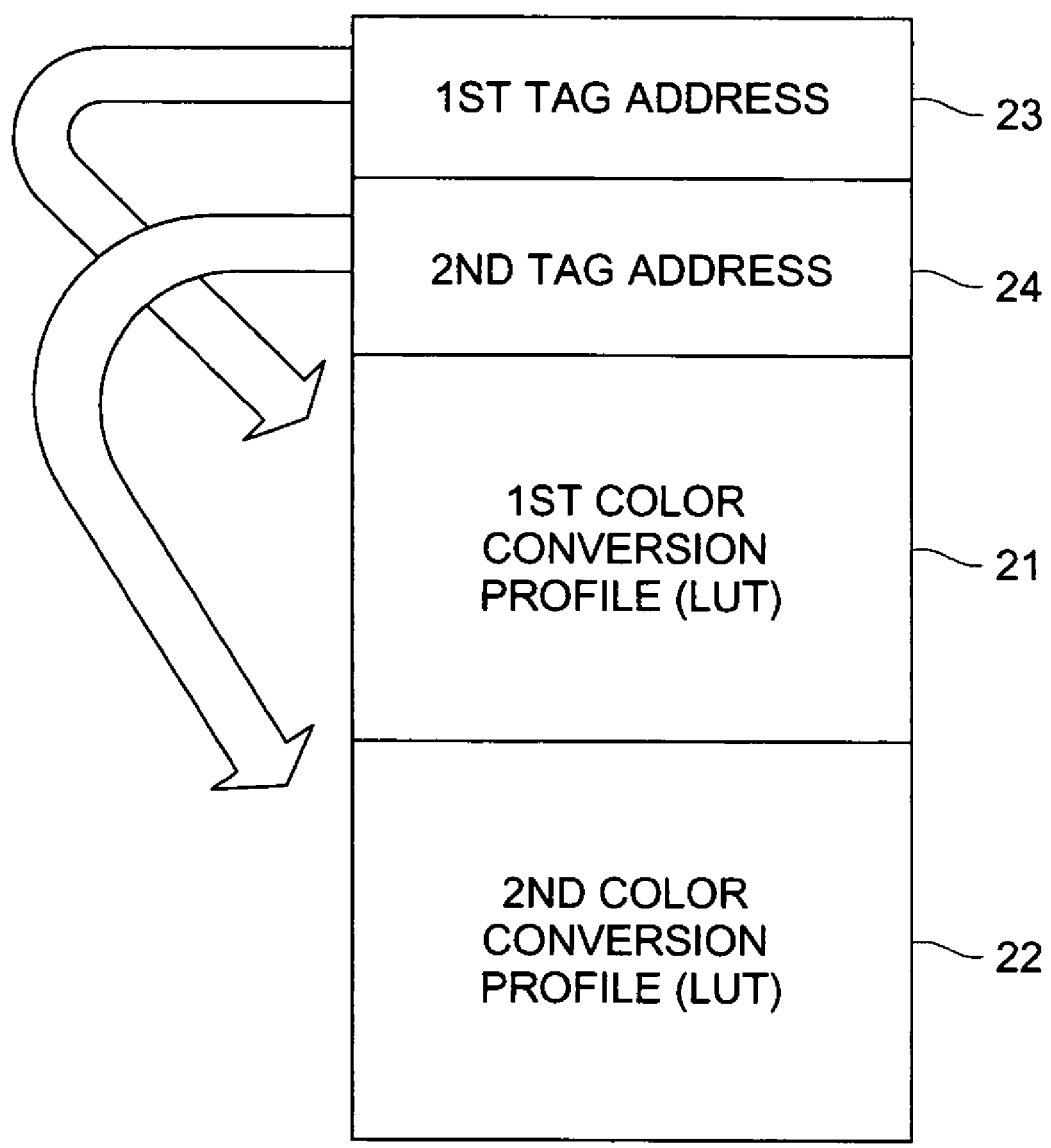
FIG. 2 is a diagram showing a file storing a first color conversion profile and a second color conversion profile.

The RAM 4 is provided with a work area for the CPU 5. Further, the RAM 4 causes the created first color conversion profile 21 and second color conversion profile 22 to be stored in one and same file as the LUTs, as shown in FIG. 2. This file also contains the first tag address 23 and second tag address 24 indicating the leading address of the LUT data of the first color conversion profile 21 and second color conversion profile 22.

The CPU 5 expands the image processing program stored in the ROM 3, into the work area of the RAM 4, and performs the aforementioned process of profile creation and image signal conversion.

The following describes the image processing method of the present invention:

This image processing method consists of the aforementioned steps of creating the aforementioned profile and converting the image signal.

Figure 3:
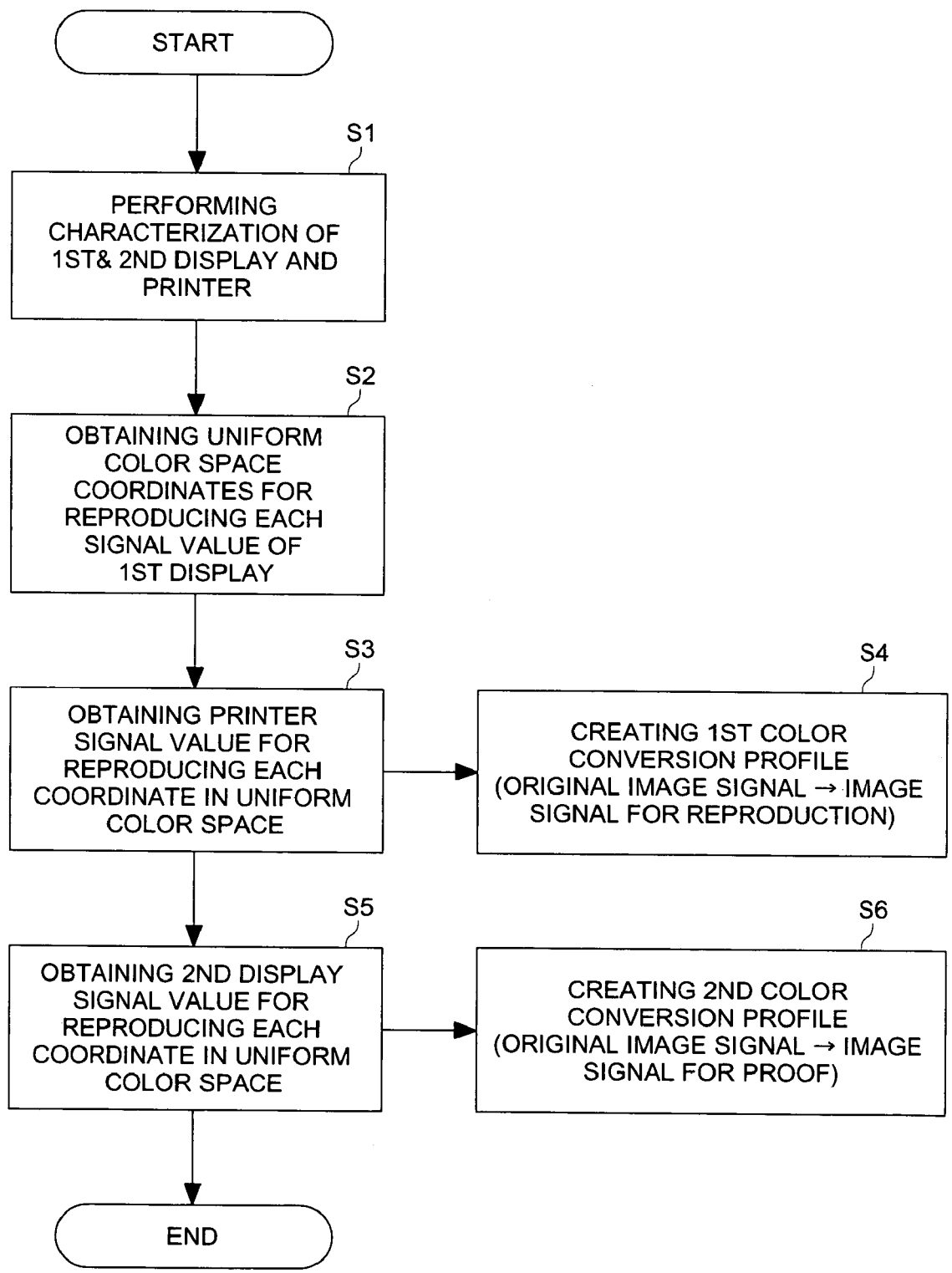
FIG. 3 is a flowchart representing the process of creating a profile.

Referring to FIG. 3, the following describes the process of profile creation:

As shown in FIG. 3, in the process of profile creation, the arithmetic processing apparatus 2 characterizes the first display 6, printer 7 and second display 8 (Step S1). The characterization in the sense in which it is used in the present embodiment is defined as finding the relationship between the signal value of the device dependent color and tristimulus values of X, Y and Z, in the form of the LUT.

To put it more specifically, in the characterization of the first display 6 and second display 8, the following formula is used to create the LUT for converting the sRGB signal value into the XYZ signal value. For the convenience of description, the LUT created for the first display 6 will be assumed as the first LUT. When the second display 8 is a CRT, characterization can be carried out by gradation conversion and matrix conversion, as disclosed in the CIE 122-1996, for example.

[Mathematical Formula 1]

$$R'_{sRGB} = R_{8bit} + 255$$

$$G'_{sRGB} = G_{8bit} + 255$$

$$B'_{sRGB} = B_{8bit} + 255$$

When $R'_{sRGB}, G'_{sRGB}, B'_{sRGB} \leq 0.04045$, $$R_{sRGB} = R'_{sRGB} + 12.92$$

-continued $$G_{sRGB} = G'_{sRGB} + 12.92$$

$$B_{sRGB} = B'_{sRGB} + 12.92$$

When $R'_{sRGB}, G'_{sRGB}, B'_{sRGB} > 0.04045$, $$R_{sRGB} = [(R'_{sRGB} + 0.055)/1.055]^{2.4}$$

$$G_{sRGB} = [(G'_{sRGB} + 0.055)/1.055]^{2.4}$$

$$B_{sRGB} = [(B'_{sRGB} + 0.055)/1.055]^{2.4}$$

and $$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{sRGB} \\ G_{sRGB} \\ B_{sRGB} \end{pmatrix}$$

Further, the known art, as the art disclosed in the aforementioned Patent Documents 1 and 2, can be used for characterization of the printer 7. It should be added that the art disclosed in the Patent Document 1 is what is commonly called "3-variable method" or "4-variable method". To put it more specifically, characterization is carried out by measuring colors on the color chip determined by the combination of variables in the number (3 or 4) smaller than that of colors used for reproduction.

Then the arithmetic processing apparatus 2 provides mapping of the color gamut between the first display 6 and printer 7.

To put it more specifically, the arithmetic processing apparatus 2 finds the uniform color space coordinates for reproducing each of the tristimulus values of the first display 6 obtained in Step S1, and calculates the information on correspondence between the tristimulus values and the color coordinate of the uniform color space (device independent color) (Step S2).

Further, the arithmetic processing apparatus 2 finds the signal value of the device dependent color of the printer 7 for reproducing each of the color coordinates in the uniform color space coordinates (Step S3).

Based on the aforementioned correspondence information, the arithmetic processing apparatus 2 finds out which type of the ink of the printer 7 has been used to reproduce each point of the first LUT, whereby the first color conversion profile 21 is created (Step S4). Thus, of the lightness, chroma and hue in the tristimulus values of the output color of the first display 6 in the first color conversion profile 21, mainly the chroma is changed and associated with the color in the color gamut of the printer 7.

A standard space such as a CIELAB, CIELUV and CIECAM02 can be used as the uniform color space. If characterization obtained in Step S1 is an ICC device profile, the CIELAB is already used for its definition, and use of the CIELAB as the uniform color space is preferred.

The art disclosed in the Official Gazette of Japanese Patent 2138462 and other known arts can be used in the aforementioned Step S3.

The art of smoothing in the post-processing step may be applied to the created first color conversion profile 21. The multi-dimensional smoothing art includes the art disclosed in the aforementioned Patent Document 1, for example.

After mapping of the color gamut, the arithmetic processing apparatus 2 finds the signal value of the device dependent color of the second display 8 for reproducing each coordinate in the uniform color space coordinates (Step S5). Based on the aforementioned correspondence information the arithmetic processing apparatus 2 then checks whether or not each point of the aforementioned first LUT is reproduced by any of the phosphors of the second display 8, whereby the second color conversion profile 22 is created (Step S6). In this manner, the arithmetic processing apparatus 2 calculates correspondence information between the tristimulus values of the first display 6 and device independent color, during the creation of the first color conversion profile 21. Based on this correspondence, the arithmetic processing apparatus 2 creates the second color conversion profile 22. This arrangement ensures the second color conversion profile 22 for proofing, to be created with a smaller memory capacity, as compared to the prior art of creating the proof profile indicating the relationship between the output color of the printer 7 and the output color of the second display 8.

The art introduced in "Po-Chieh Hung, Colorimetric calibration in electronic imaging devices using a look-up-table model and interpolations, Journal of Electronic Imaging, 2 (1), 53-61 (1993)" (a research paper in English) or the art disclosed in the Official Gazette of Japanese Patent 2895086 can be used in the Step S4.

When smoothing is applied to the first color conversion profile 21, it is also applied to the second color conversion profile 22. The differences in measurements of the outputs between the printer 7 and second display 8 are reduced by applying the art of smoothing to both the first color conversion profile 21 and second color conversion profile 22, as described above.

Figure 4:
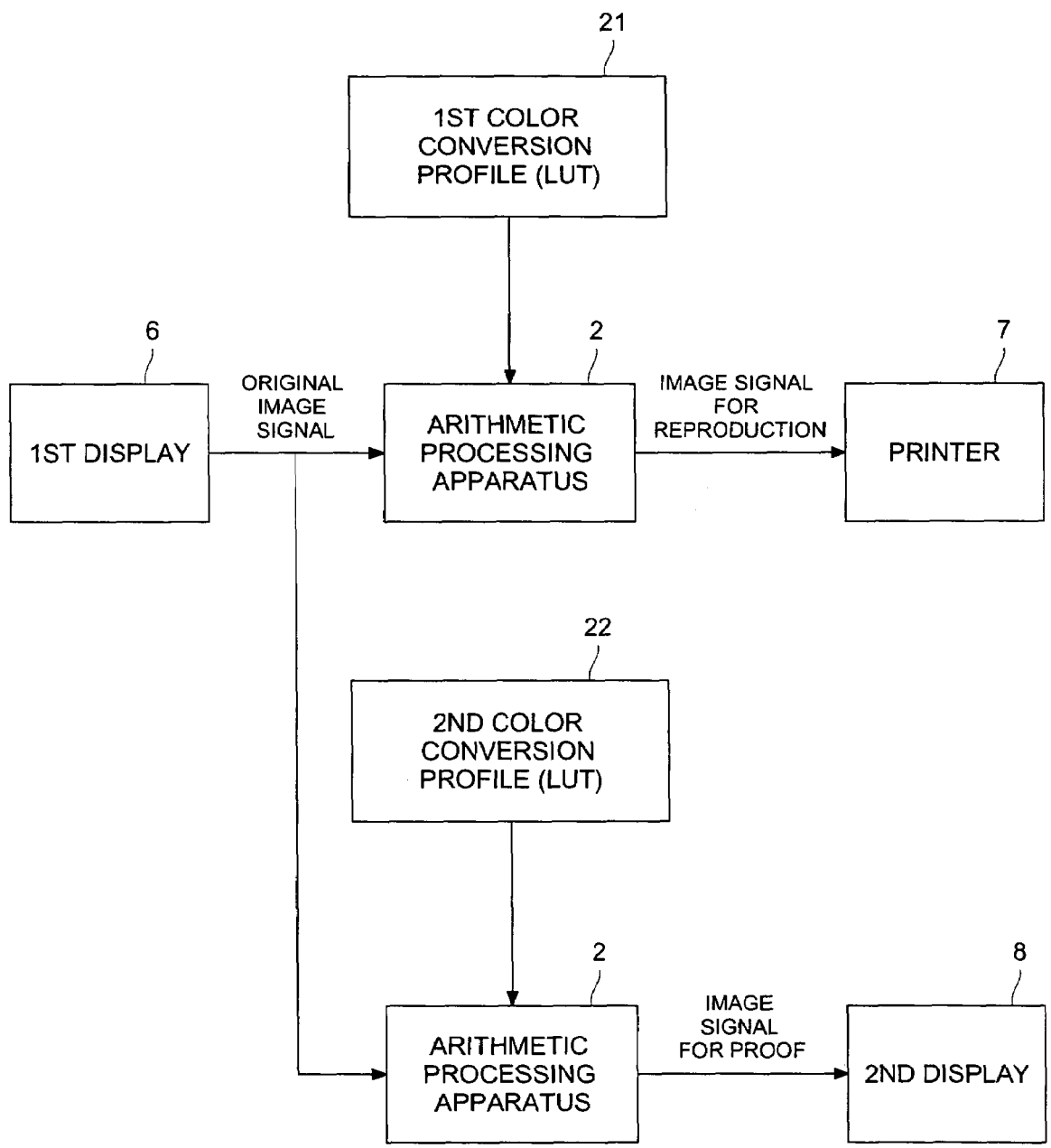
FIG. 4 is a block diagram showing the flow of image signal conversion.

Referring to FIG. 4, the following describes the process of image signal conversion:

As shown in FIG. 4, the arithmetic processing apparatus 2 performs interpolation arithmetic processing in the image signal conversion, thereby converting the original image signal into the image signal for proof, based on the first color conversion profile 21. In this case, since the arithmetic processing apparatus 2 stores the first color conversion profile 21 and second color conversion profile 22 in one and the same file, easy handling of the color conversion profile is ensured.

Interpolation arithmetic processing can be performed by a known method such as the method disclosed in the Official Gazette of Japanese Patent Tokkaisho 53-123201, for example. Further, in FIG. 4, the arithmetic processing apparatus 2 is divided in two portions for the sake of expediency in illustration.

The second display 8 outputs the image signal for proof, whereby the color reproduced by the printer 7 is proofed.

According to the aforementioned image processing method, the second color conversion profile for proof can be created with a smaller storage capacity, even when a plurality of hifi colors are to be outputted by the printer 7. Consequently, even if the original image is reproduced using a plurality of hifi colors, proofing is enabled with a smaller storage capacity without high-order characterization.

Variation of Embodiment

A variation of the image processing apparatus 1 will be described. The same reference numerals will be assigned to the same components as those of the aforementioned first embodiment and their description will be omitted.

Figure 5:
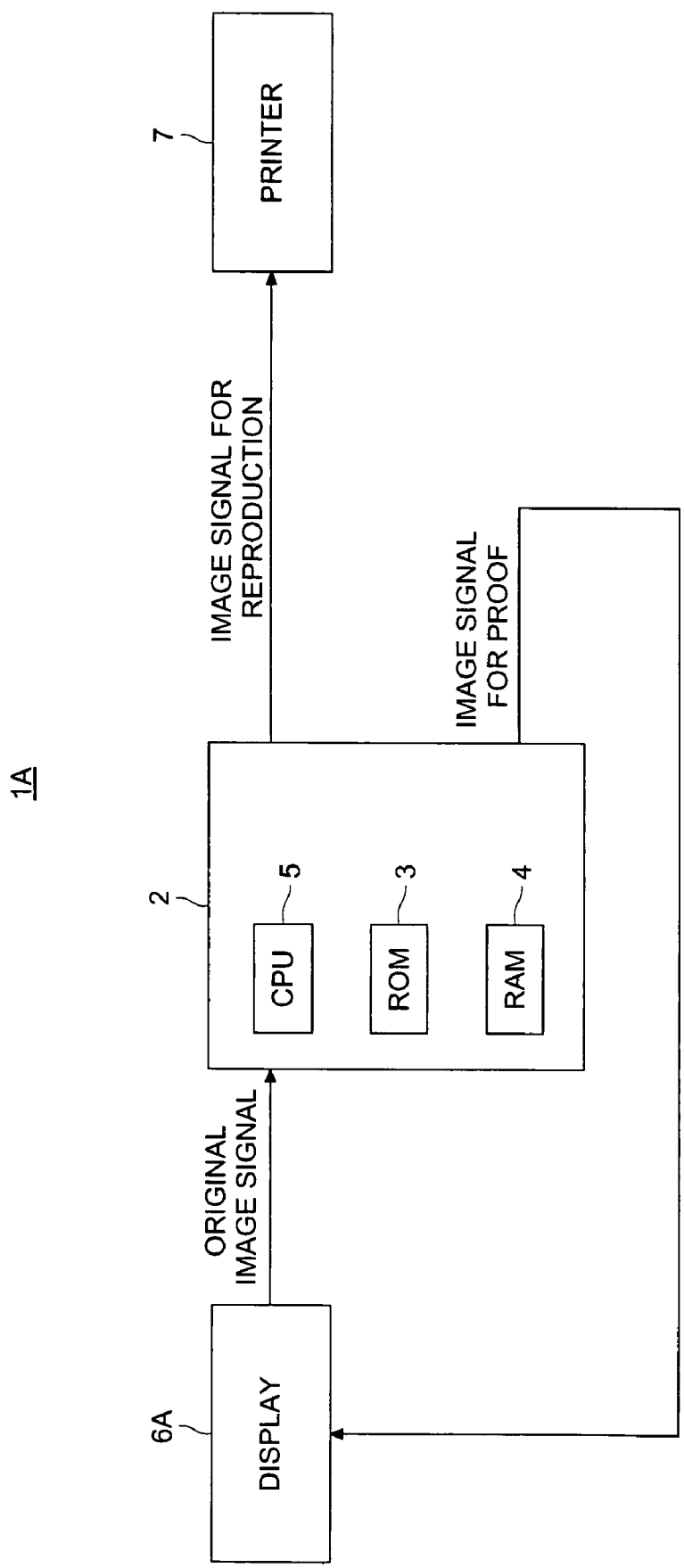
FIG. 5 is a block diagram showing the schematic configuration of an image processing apparatus in a variation of an embodiment.

The image processing apparatus 1A is provided with a display (first output apparatus, proof apparatus) 6, as shown in FIG. 5.

Based on the original image signal, the display 6A outputs the original colored image and serves the function of the proof apparatus for proofing the color reproduced by the printer 7.

Further, the display 6A is capable of simultaneous display of the original image and proof image in parallel.

Figure 6:
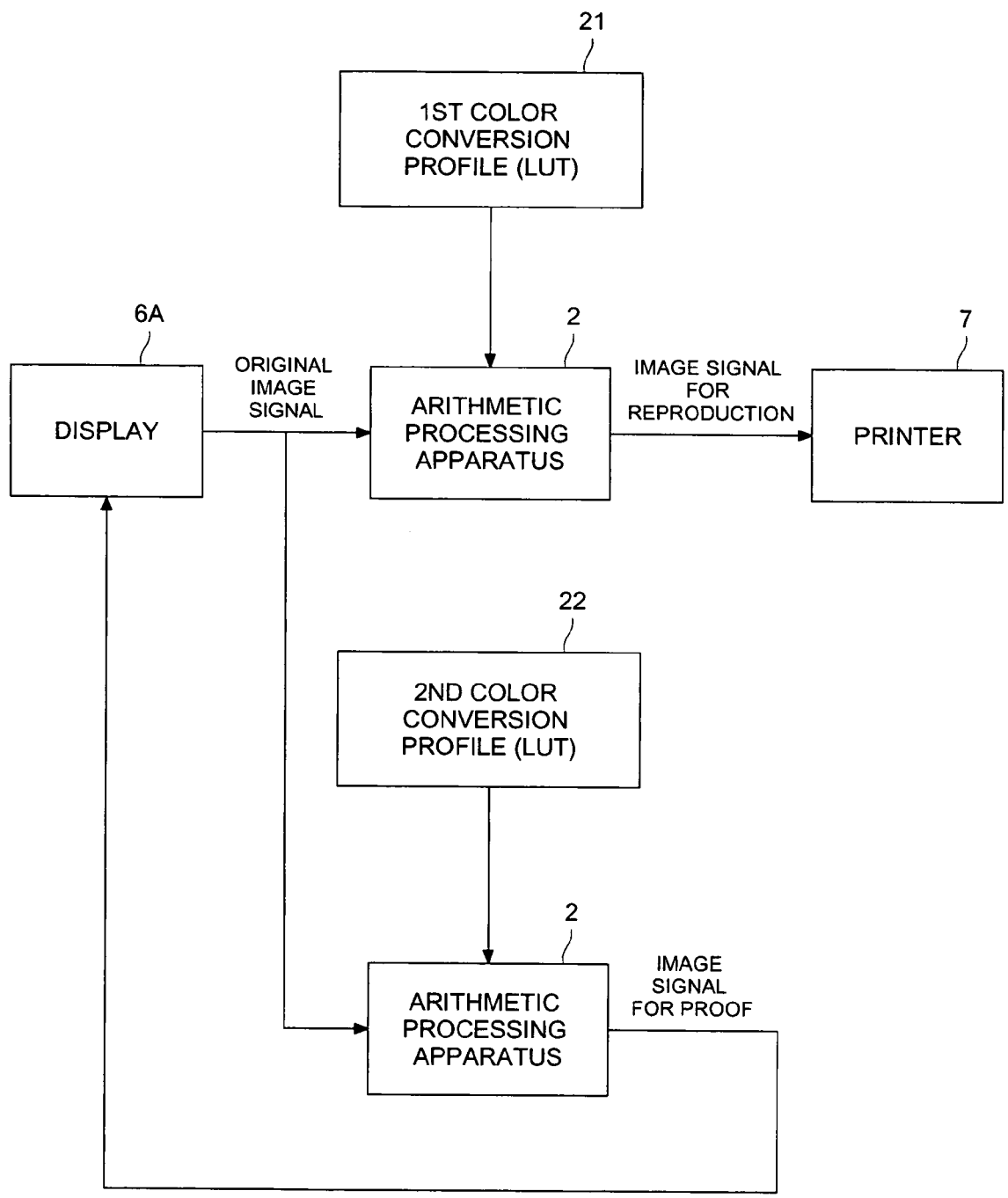
FIG. 6 is a block diagram showing the flow of image signal conversion process in a variation of an embodiment.
Figure 7:
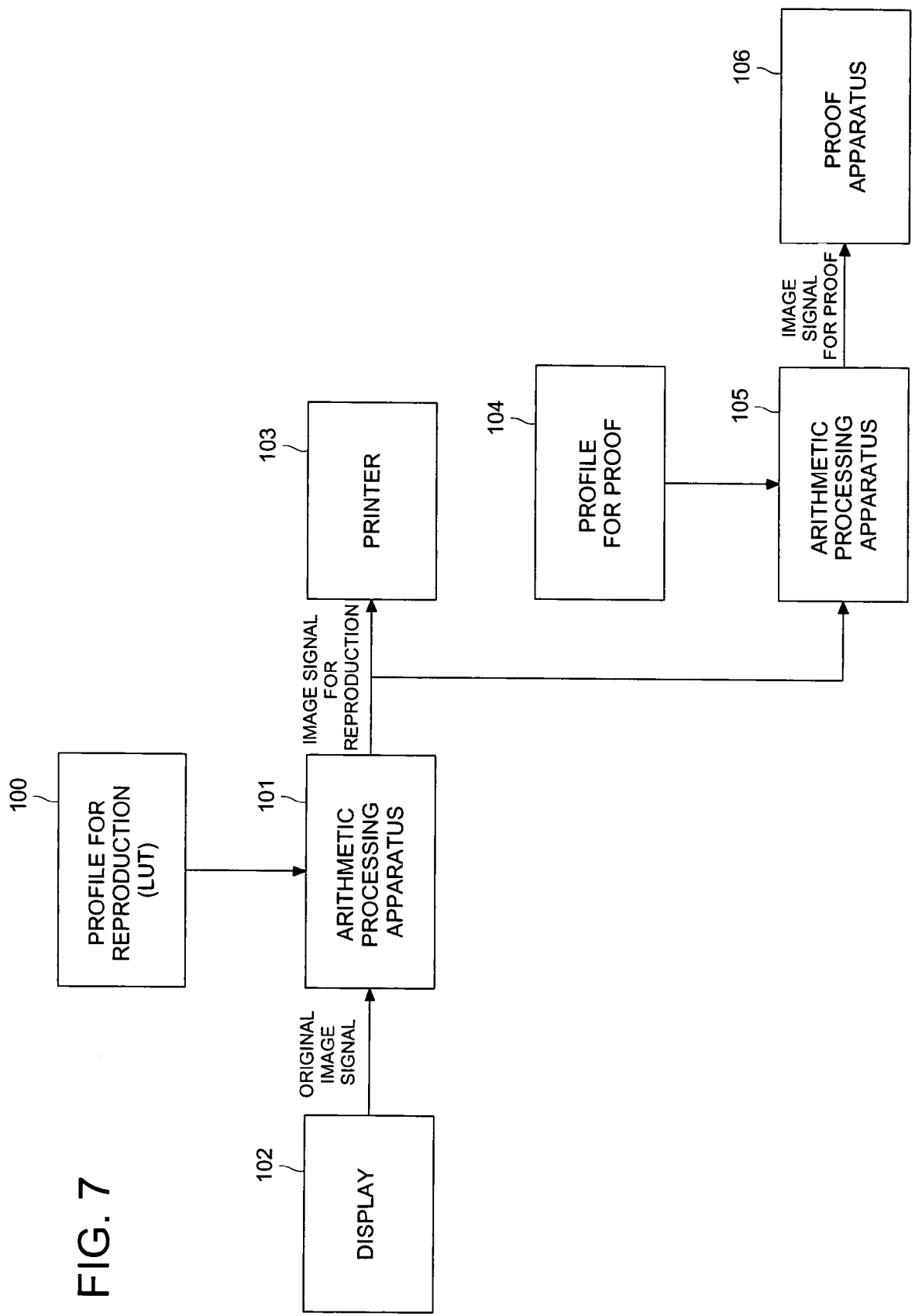
FIG. 7 is a block diagram showing the flow of image processing by a prior art image processing apparatus.

As shown in FIG. 6, the image processing apparatus 1A allows the display 6A to output the image signal for proof created by the arithmetic processing apparatus 2, thereby proofing the color reproduced by the printer 7.

According to the image processing apparatus 1A, the display 6A provides simultaneous display of the original image and proof image in parallel. This arrangement ensures easy comparison between the original image and proof image.

In the aforementioned description of the embodiment and variation, a color display is used as the proof apparatus. However, a color printer can also be used as the proof apparatus. In this case, the art disclosed in the aforementioned research paper in English version may be used in the characterization of the proof apparatus.

Further, in the aforementioned description of the embodiment and variation, a standard space is used as the uniform color space. It is also possible to use a non-standard one. In this case, it is possible to make such arrangements that the tristimulus values are back-calculated from the non-standard uniform color space coordinates according to the definition formula of the uniform color space in Steps S3 and S5, thereby finding the signal value of device dependent color for reproducing the colors of the tristimulus values. Further, after back-calculating the tristimulus values in the similar manner, it is possible to calculate the standard uniform color space coordinates from the tristimulus values and to find the signal value of the device independent color for reproducing these color coordinates.

Further, in the aforementioned description of the embodiment and variation, the second color conversion profile 22 is created by finding the signal value of the device dependent color of the second display 8 for reproducing each color coordinate in the uniform color space coordinates. However, an ICC profile format can be used to create the second color conversion profile 22. In this case, the image signal for proof created according to the second color conversion profile indicates the signal value of the device independent color in conformance to the ICC format. This arrangement allows any desired proof apparatus to be selected. In this case, the ICC calorimetric intent format, namely, ICC profile A2B1 (calorimetric color reproduction intent) tag format is preferred to be utilized as the ICC profile format.

In the aforementioned description of the embodiment and variation, the first color conversion profile 21 is created in the aforementioned Steps S1 through S3. This profile can also be created by the combination of input device profile defined by the ICC and output apparatus profile, namely, the device profile of the first display 6 and device profile of the printer 7. In this case, the ICC profile of the aforementioned A2B1 for each of the first display 6 and printer 7 is used as the data for characterization.

Further, in the aforementioned description of the embodiment and variation, the arithmetic processing apparatus 2 executes the Step S5 after the aforementioned Steps S2 through S4. However, it can execute the Step S5 before Steps S3 and S4, only if the Step S5 is executed after Step S2.

What is claimed is:

1. An image processing apparatus comprising an arithmetic processing apparatus for calculating image signals for proof in order for proofing a reproduced color with a proof apparatus when an original color image outputted from a first output apparatus is reproduced by a second output apparatus, wherein the arithmetic processing apparatus is configured to:
   create a first color conversion profile for converting original image signals for the first output apparatus into image signals for reproduction with the second output apparatus, by calculating a device independent color by the use of color gamut mapping;
   calculate, in the process to create the first color conversion profile, correlation information between each signal value of a device dependent color of the first output apparatus and the device independent color which is determined by the color gamut mapping;
   create a second color conversion profile for converting the original image signals into signal values derived from calorimetric values for reproduction with the proof apparatus, based on the correlation information; and
   convert the original image signal into the image signal for proof, based on the second conversion profile.

2. The image processing apparatus of claim 1, wherein the second output apparatus uses a hifi color material other than CMY color materials or RGB color materials.

3. The image processing apparatus of claim 2, wherein a signal value of the image signal for proof indicates a device independent color.

4. The image processing apparatus of claim 2, wherein the arithmetic processing apparatus allows the first color conversion profile and the second color conversion profile to be stored in one and the same file.

5. The image processing apparatus described in claim 1, wherein the first output apparatus and the proof apparatus belong to one and the same display.

6. The image processing apparatus of claim 5, wherein an signal value of the image signal for proof indicates a device independent color.

7. The image processing apparatus of claim 1, wherein the arithmetic processing apparatus allows the first color conversion profile and the second color conversion profile to be stored in one and the same file.

8. The image processing apparatus of claim 1, wherein a signal value of the image signal for proof indicates a device independent color.

9. The image processing apparatus of claim 8, wherein the arithmetic processing apparatus allows the first color conversion profile and the second color conversion profile to be stored in one and the same file.

10. An image processing method for calculating image signals for proof in order for proofing a reproduced color with a proof apparatus when an original color image outputted from a first output apparatus is reproduced by a second output apparatus, wherein the image processing method comprising:
    creating a first color conversion profile for converting original image signals for the first output apparatus into image signals for reproduction of the second output apparatus, by calculating a device independent color by the use of color gamut mapping;
    calculating, in the process to create the first color conversion profile, correlation information between each signal value of a device dependent color of the first output apparatus and the device independent color which is determined by the color gamut mapping;
    creating a second color conversion profile for converting the original image signals into signal values derived from colorimetric values for reproduction with the proof apparatus, based on the correlation information; and
    converting the original image signal into the image signal for proof, based on the second conversion profile.

11. The image processing method of claim 10, wherein the coloring material of the second output apparatus uses the hifi color material other than CMY color material or RGB color material.

12. The image processing method of claim 11, wherein an image signal indicating the device independent color is used as the image signal for proof.

13. The image processing method of claim 11, wherein the first color conversion profile and second color conversion profile are stored in one and the same file.

14. The image processing method of claim 10, wherein one and the same display is used as the first output apparatus and the proof apparatus.

15. The image processing method of claim 12, wherein an image signal indicating the device independent color is used as the image signal for proof.

16. The image processing method of claim 10, wherein the first color conversion profile and second color conversion profile are stored in one and the same file.

17. The image processing method of claim 10, wherein an image signal indicating the device independent color is used as the image signal for proof.

18. The image processing method of claim 17, wherein the first color conversion profile and second color conversion profile are stored in one and the same file.

* * * * *